(12) United States Patent
Kock et al.

(10) Patent No.: US 9,766,260 B2
(45) Date of Patent: Sep. 19, 2017

(54) ARRANGEMENT FOR DETERMINING A REVOLUTION RATE AND DIRECTION OF ROTATION OF A ROTATING COMPONENT

(71) Applicant: MAN TRUCK & BUS AG, Munich (DE)

(72) Inventors: Peter Kock, Anzing (DE); Günter Bücklers, Munich (DE); Christoph Steinberg, Dachau (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 15/130,389

(22) Filed: Apr. 15, 2016

(65) Prior Publication Data
US 2016/0305975 A1 Oct. 20, 2016

(30) Foreign Application Priority Data
Apr. 18, 2015 (DE) .................. 10 2015 004 992

(51) Int. Cl.
| | | |
|---|---|---|
| *G01B 7/30* | (2006.01) | |
| *G01R 33/07* | (2006.01) | |
| *G01B 7/14* | (2006.01) | |
| *G01P 3/44* | (2006.01) | |
| *G01P 3/488* | (2006.01) | |
| *G01P 13/04* | (2006.01) | |

(Continued)

(52) U.S. Cl.
CPC .............. *G01P 3/44* (2013.01); *B62D 63/04* (2013.01); *G01D 5/145* (2013.01); *G01P 3/488* (2013.01); *G01P 13/045* (2013.01)

(58) Field of Classification Search
CPC ....................................... G01B 7/30
USPC ..................................... 324/207.25
See application file for complete search history.

(56) References Cited

U.S. PATENT DOCUMENTS

| 4,253,341 A | 3/1981 | Ikeda et al. |
| 5,682,095 A | 10/1997 | Mathes et al. |
| (Continued) | | |

FOREIGN PATENT DOCUMENTS

| DE | 4141958 | 6/1993 |
| DE | 4141958 A1 | 6/1993 |
| (Continued) | | |

OTHER PUBLICATIONS

Partial Translation of DE 19714351, Oct. 1998.*
Search Report dated Aug. 17, 2016 which issued in the corresponding European Patent Application No. 16000667.

*Primary Examiner* — Bot Ledynh
(74) *Attorney, Agent, or Firm* — Cozen O'Connor

(57) ABSTRACT

A sensor device for contactlessly determining a revolution rate and a direction of rotation of a component that rotates during operation of the component, the component having, on at least one peripheral region, a circumferential structure of web-shaped or tooth-shaped radial protrusions and interposed grooves or tooth gaps includes: a threaded segment configured to positionally fix an arrangement of the sensor device so that the circumferential structure of the component is movable past the sensor device; a magnetic field generating device; and a magnetic field detecting device having at least three magnetic field sensors that are not arranged in alignment along a line. A distance between the magnetic field sensors that are the farthest apart from each other is less than or equal to a width of the grooves or tooth gaps of the component.

12 Claims, 3 Drawing Sheets

(51) Int. Cl.
*B62D 63/04* (2006.01)
*G01D 5/14* (2006.01)

(56) References Cited

U.S. PATENT DOCUMENTS

| | | |
|---|---|---|
| 8,283,914 B2 | 10/2012 | Mehnert et al. |
| 2006/0043963 A1 | 3/2006 | Kaneyasu et al. |
| 2006/0082365 A1 | 4/2006 | Hudson et al. |
| 2008/0083168 A1 | 4/2008 | Booth et al. |
| 2008/0180089 A1 | 7/2008 | Stolfus et al. |
| 2010/0026279 A1 | 2/2010 | Vig et al. |
| 2010/0213927 A1 | 8/2010 | Mehnert et al. |
| 2012/0293167 A1 | 11/2012 | Kitanaka et al. |

FOREIGN PATENT DOCUMENTS

| | | |
|---|---|---|
| DE | 19714351 | 10/1998 |
| DE | 10 2006 039 490 | 3/2008 |
| EP | 0 800 087 A2 | 10/1997 |
| EP | 2 221 587 | 8/2010 |
| JP | 11-132790 | 5/1999 |
| JP | 2004-340669 | 12/2004 |

\* cited by examiner

ARRANGEMENT FOR DETERMINING A REVOLUTION RATE AND DIRECTION OF ROTATION OF A ROTATING COMPONENT

BACKGROUND OF THE INVENTION

1. Field of the Invention

The invention relates to an arrangement for contactlessly determining a revolution rate and direction of rotation of a component that rotates during its operation, in particular a magnetizable shaft of a motor vehicle.

2. Related Art

Different revolution rate sensors for determining the revolution rate of a component that rotates during its operation are known from the prior art. Such revolution rate sensors are, for example, used for detecting a revolution rate and a direction of rotation of a gear wheel or a transmission shaft in a gearbox of a motor vehicle.

For contactlessly detecting a revolution rate, revolution rate sensors are usually used that are equipped with a magnetic field sensor (for example a Hall sensor). In such sensors, a magnetic field, which changes when a tooth of the gear wheel passes, is generated by a magnet in the vicinity of the Hall sensor. During this the Hall sensor first detects the so-called background field of the magnet. A field strength arising from the mass of the gear wheel or of a comparable component is added to the field strength of the background field. If a tooth instead of a tooth gap is associated with the sensor, this results in a repeated boosting of the magnetic field for the duration of the association of the tooth with the sensor. Thus if the gear wheel is turning, a fluctuation of the field strength takes place depending on the passage of the teeth and tooth gaps past the sensor. The Hall sensors thus detect the change of the magnetic field and generate electrical signals, from which the revolution rate or a position angle of the gear wheel can be determined. Each tooth thus produces a pulse, and the revolution rate can be determined by counting the pulses. More precisely, the revolution rate sensor does not detect the tooth as such, but detects the transition from tooth to tooth gap or vice-versa.

In particular, revolution rate sensors that comprise two Hall elements are known from the published patent applications DE 41 1 958 A1 and EP 0 800 087 A2. For the measurement of revolution rates, the revolution rate sensor is, for example, disposed opposite the gear wheel such that a tooth of the gear wheel first passes the first Hall sensor and then the second Hall sensor during a rotational movement. For this purpose, the two Hall elements must be disposed offset when viewed in the circumferential direction or the direction of rotation of the gear wheel or of the component. With Hall elements offset in this way when viewed in the direction of rotation of the gear wheel, the tooth first comes to one Hall element and, after a certain angle of rotation, to the second Hall element. The oscillations of the magnetic field of the two sensors resulting therefrom are offset relative to each other when viewed over time. In this manner, not only the angular speed and angular acceleration can be determined, but also the direction of rotation, because depending on the direction of rotation the one Hall element or the other Hall element measures the fluctuation first.

If, however, a rotation sensor is installed such that a stationary tooth is opposite both Hall elements at the same time, i.e., both Hall elements are at the same distance from the edge of the next tooth, then the total magnetic field strength on the two Hall elements is the same at any measurement point in time, and a direction of rotation can no longer be determined. This problem can in particular occur with revolution rate sensors with screw mountings. If the rotary position of the sensor in the screwed-in position is such that the two Hall elements are essentially at the same distance from the edge of the next tooth, the direction of rotation cannot be determined or measurement inaccuracies can occur if the difference in distance is too small or is unknown. With such sensors it must be ensured during installation that the two Hall elements are correctly aligned in the final position, therefore a time-consuming readjustment may be necessary.

In order to avoid this problem, in DE 41 41 958 A1 a revolution rate sensor is proposed with which the two Hall elements and the magnet in the revolution rate sensors are disposed so as to be displaceable relative to each other. For example, it is proposed that the magnet is inserted into a holder that can be displaced relative to the body in the interior of the revolution rate sensor. This does enable incorrect alignments to be corrected, but this is time-consuming, is liable to errors and requires suitably trained skilled staff during the installation.

SUMMARY OF THE INVENTION

It is thus an object of the invention to provide an improved arrangement, in particular an improved rotation sensor device, for contactlessly determining a revolution rate and a direction of rotation of a component that rotates during its operation, with which the disadvantages of conventional techniques can be avoided. An object of the invention is in particular to provide a revolution rate sensor with which a revolution rate and a direction of rotation of a rotating component can be determined and that can be mounted rapidly and that does not require complex calibration or adjustment.

The arrangement according to one aspect of the invention comprises, a component that rotates during its operation, wherein the component comprises on at least one peripheral region a circumferential structure of web-shaped or tooth-shaped radial protrusions and interposed grooves or tooth gaps. The circumferential structure can be part of the surface structure of the rotating component or can be provided in the form of a separate revolution rate sensor that can be mounted on the component. The component can, for example, be a magnetizable shaft, i.e., a shaft made of a ferromagnetic material.

The arrangement further comprises a screw-in sensor device, by which the revolution rate and the direction of rotation of the component can be determined. The sensor device comprises a threaded segment, by which the sensor device can be screwed in for the positionally fixed arrangement of the sensor device. The sensor device is disposed such that the circumferential structure can be moved past the sensor device. The sensor device further comprises a magnetic field generating device and a magnetic field detecting device. The sensor device will also be referred to below as a revolution rate sensor.

According to general aspects of the invention, the magnetic field detecting device comprises at least three magnetic field sensors, which are not disposed along a line in alignment and are thus disposed offset. In other words, the magnetic field sensors are disposed offset so that regardless of the screwed-in position of the sensor device during rotation of the component, each protrusion reaches at least two of the at least three magnetic field sensors with a time offset. Looking in the circumferential direction of the protrusions or in the direction of rotation of the component, there are thus always at least two of the at least three magnetic field sensors that are disposed offset. The distance of the magnetic field sensors that are farthest apart from each other is in this case less than or equal to a width of the grooves or tooth gaps of the circumferential structure. The magnetic field sensors are disposed such that they interact with the magnetic field generating device and face the circumferential structure of the rotating component.

The provision according to the invention of at least three magnetic field sensors gives the particular advantage that regardless of the installation position of the sensor, i.e., the rotary position in the screwed-in state, there are always at least two magnetic field sensors at a different distance from the edge of the nearest protrusion, so that besides the determination of the angular rate of rotation, a determination of the direction of rotation is always possible—regardless of the angular position in which the sensor device is mounted. For this reason it is not necessary, when screwing in the sensor device, to pay attention to how the magnetic field sensors are oriented in the final position. As a result, the above aspect of the invention enables rapid assembly and mounting-related measurement errors to be avoided. Further, as a result of the distance of the magnetic field sensors that are farthest apart being less than or equal to a width of the grooves or tooth gaps, it is ensured that the change in the magnetic field strength recorded by different sensors is produced by the rotating component from the same edge. This enables reliable measurement of the angular rate of rotation of the shaft and the direction of rotation.

A particularly preferred exemplary embodiment provides that the magnetic field detecting device is formed by three magnetic field sensors that are disposed in the form of a triangle. In this case the lengths of the sides of the triangle are less than or equal to a width of the grooves or tooth gaps. The arrangement in the form of an equilateral triangle is particularly advantageous here. The arrangement in the form of an equilateral triangle enables a simplified analysis and computer processing of the detected magnetic field signals. Further, as a result it is ensured that in any rotary position the two magnetic field sensors that are farthest apart when viewed in the direction of rotation have a certain minimum separation from each other, which is advantageous for the detection of very high frequencies.

According to a further embodiment, an analyzer, such as a processor, for analysis of the output signals of the at least three magnetic field sensors is further provided, being configured to determine the two magnetic field sensors that are the farthest apart from each other when viewed in the direction of rotation of the component, i.e., in the circumferential direction of the component or of the protrusions, and to use the measured flux changes of the two magnetic field sensors to determine a direction of rotation.

This ensures that in any installation position those two magnetic field sensors between which the time difference of the change in magnetic field produced by the edge of a protrusion is greatest are used for measurement, which improves the measurement accuracy. The analyzer is preferably in the form of part of the internal analysis electronics of the sensor device, but can also be implemented as an external analyzer.

The sensor device advantageously comprises a learning function, by which it can be stored in the sensor device which of the two magnetic field sensors that are used for the determination of the direction of rotation must first detect a change of flux from a low flux to a higher flux so that there is a first direction of rotation and not the opposite direction of rotation. In a learning phase the component is thus rotated in a predetermined first direction of rotation and an assessment is made of which magnetic field sensor first detects the change of flux from the low flux to the higher flux. If, in normal operation, the sensor again detects the change of flux from a low flux to a higher flux first before the other sensor, the first direction of rotation exists, otherwise the opposite direction of rotation exists.

According to a further embodiment, the at least three magnetic field sensors are disposed in a plane perpendicular to a radial direction of the component or of the circumferential structure, so that the sensors are at essentially the same radial distance from the rotating component.

The implementation, according to an aspect of the invention, may provide that the sensor device is configured to detect a vibration of the component if the magnetic field sensor signals indicate a non-zero angular rate of rotation but no definite direction of rotation. In such implementation, vibrations can be detected, which is a frequent problem that occurs when shafts are not rotating, in particular transmission shafts, if the machine is not rotating but vibrations are present. Such vibrations can cause flux changes and thus angular rotation rate calculations. However, the sensor device does not measure a definite direction of rotation, because clockwise and anticlockwise rotations are alternately detected in equal proportions.

The magnetic field sensors of the sensor device can be active magnetic field flux sensors, which preferably operate according to the Hall principle (Hall probes).

According to a further aspect of the invention, the sensor device can comprise a housing that comprises an end region, in which the magnetic field sensors are mounted to form a measurement tip. The housing can further comprise a housing body disposed at the opposite end, in which are disposed a plug connector for the sensor device and a microprocessor unit for analysis of the measurement signals of the magnetic field sensor to which the output signals of the magnetic field sensors are transmitted for analysis. The housing can further comprise the threaded segment for screwing in the sensor device, which is preferably disposed between the end region and the housing body.

The magnetic field generating device can be implemented in the form of a permanent magnet or in the form of a coil that can be energized that generates a magnetic field. The magnetic field generating device preferably comprises a coil for generating the magnetic field that is integrated within a sensor housing. The coil can, for example, be integrated within the threaded segment.

In another aspect, the invention further related to a motor vehicle, in particular a commercial vehicle, with an arrangement or a sensor device as disclosed herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The preferred embodiments and features of the invention described above can be combined with each other in any way. Further details and advantages of the invention are described below with reference to the accompanying figures. In the figures.

DETAILED DESCRIPTION OF THE PRESENTLY PREFERRED EMBODIMENTS

Figure 1A:
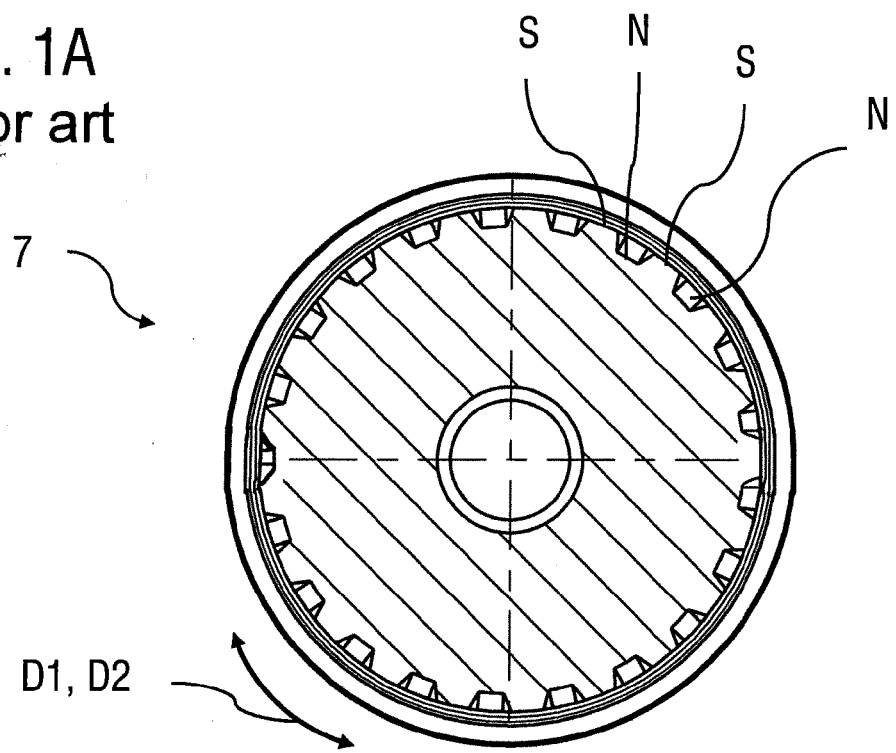
FIG. 1A shows a front view of a known shaft.
Figure 1B:
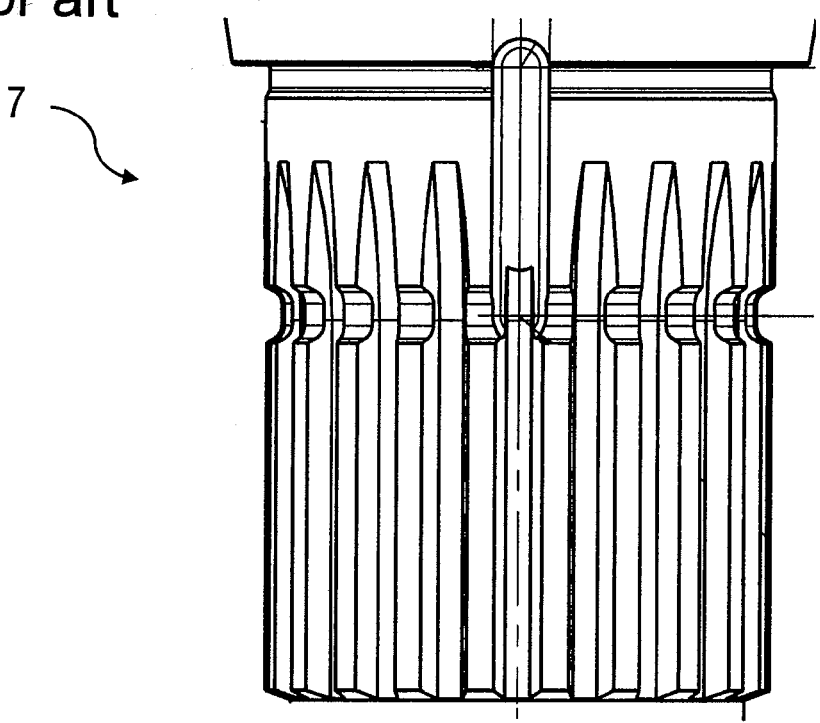
FIG. 1B shows a top view of the known shaft of FIG. 1A.

FIGS. 1A and 1B show a known shaft 7 made of a ferromagnetic material as an example of a component that rotates during its operation, the angular rate of rotation, acceleration and direction of rotation of which are intended to be measured by a sensor device. The shaft comprises a regular circumferential structure of grooves N and webs S. All the webs S have the same width as one another, and all the grooves N have the same width as one another, but the width of the grooves can be different from the width of the webs. The two possible directions of rotation D1 and D2 of the shaft 7 are indicated with the double arrow designated by D1 and D2.

Figure 2A:
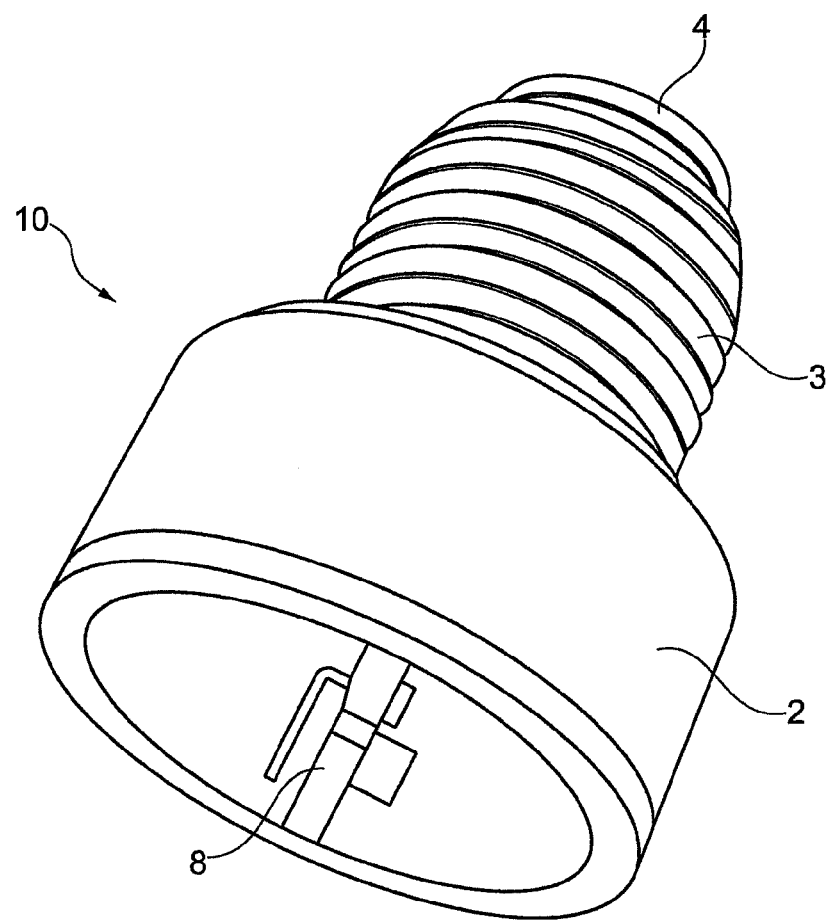
FIG. 2A shows a perspective view of a revolution rate sensor known from the prior art.

FIG. 2A shows schematically in a perspective view the design of a revolution rate sensor 10 that is known from the prior art. The known revolution rate sensor is implemented as a screw-in revolution rate sensor and comprises for this purpose a neck segment 3 with an external thread. The sensor is screwed into a corresponding threaded opening by the threaded segment 3, so that the sensor tip 4 is disposed radially opposite the circumferential structure of the shaft 7. In the sensor tip 4, which is implemented as a tapering end region, one or two Hall probes are disposed in the revolution rate sensor 10 that is known from the prior art. The opposite end the revolution rate sensor 10 comprises a body 2 in which a plug connector 8 and a microprocessor are disposed. The output signals of the Hall probes are transmitted to the microprocessor.

Figure 2B:
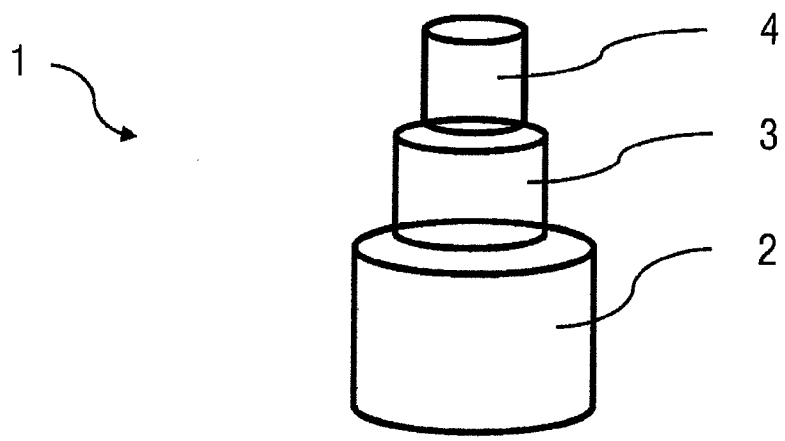
FIG. 2B shows a schematic view of a sensor device according to an embodiment of the invention.
Figure 3:
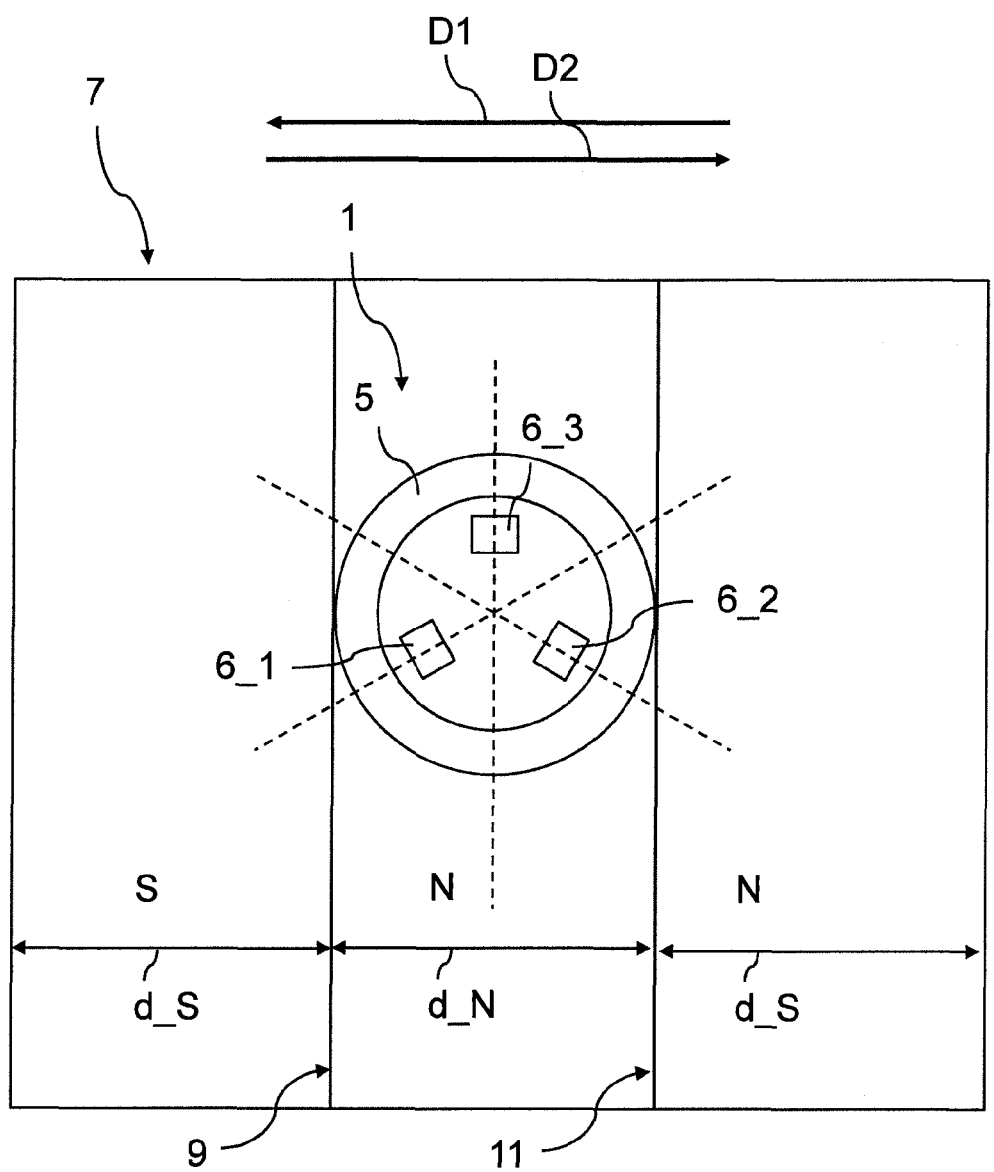
FIG. 3 shows a schematic representation of an arrangement of a sensor device and of a rotating component according to an embodiment of the invention.

FIG. 2B shows an embodiment of a sensor device 1 according to an aspect of the present invention in a highly schematic representation. The sensor device 1 comprises a comparable housing to the sensor device 10 known from the prior art with an end region 4, a threaded segment 3 and a housing body 2, in which a plug connector and the microprocessor are disposed. However, in contrast to the sensor 10 known from the prior art, in the embodiment three active magnetic field sensors are disposed in the end region 4 of the sensor 1 according to the invention, which arrangement is illustrated in FIG. 3. The coil (not shown in FIG. 2B) for generating the magnetic field is integrated within the casing of the housing.

FIG. 3 shows a top view of an arrangement of the shaft 7 and the sensor device 1. Of the shaft 7 only a section of each of a groove N and two adjacent webs S is shown in FIG. 3. The width of the webs is characterized by the double arrow d_S, the width of the groove by the double arrow d_N. The two directions of rotation of the shaft 7 are in turn characterized by the arrows D1 and D2.

Only the coil 5 for generating the magnetic field and the three active magnetic field sensors 6_1, 6_2 and 6_3 of the sensor 1 are schematically represented in FIG. 3 to illustrate the principle of the embodiment. The coil 5 is integrated within the casing of the housing of the threaded segment 3 and generates a magnetic field with which the three magnetic field sensors 6_1, 6_2 and 6_3 interact. The three magnetic field sensors are preferably implemented with the same construction as one another and are disposed in the form of an equilateral triangle, i.e., the points at which the three magnetic field sensors 6_1, 6_2 and 6_3 are disposed constitute the corner points of an equilateral triangle. For illustration the dashed lines through the sensor and the center point of the triangle are shown, wherein each of the dashed lines of two adjacent magnetic field sensors form an angle of 60° with each other. It is characteristic that the diameter of the entire sensor head is less than or equal to the width d_N of the groove N. The three magnetic field sensors 6_1 to 6_3 are each connected to a microprocessor that is disposed in the housing body 2.

As can be seen in FIG. 3, the triangular arrangement of the three magnetic field sensors 6_1, 6_2 and 6_3 ensures that they are not disposed in alignment along a line, but are disposed offset, so that regardless of the screwed-in position of the sensor device each edge of a web S reaches at least two of the at least three magnetic field sensors with an offset in time during rotation of the component. Looking in the circumferential direction of the webs S or grooves N or in the direction of rotation D1, D2 of the component, at least two of the three magnetic field sensors 6_1 to 6_3 are thus always disposed offset. In every possible screwed-in position of the sensor device 1 there are thus always at least two magnetic field sensors at a different distance from the edge of the nearest web. In the installation position shown in FIG. 3, during rotation of the component 7 in the direction D2 the edge, in this case the edge 9, first reaches the sensor 6_1, then the sensor 6_3 and finally the sensor 6_2. During a rotation in the opposite direction D1, the order is reversed.

Even in an installation position in which, for example, the sensors 6_2 and 6_3 would be at the same distance from the edge, e.g., the edge 11, (situation not shown in FIG. 3), the distance of the sensor 6_1 from the edge 11 would be different from that of sensors 6_2 and 6_3. The magnetic field sensors 6_1 to 6_3 measure the changes in the magnetic flux between the grooves N and webs S. For this purpose, the sensor device 1 is implemented to record the time for a change of flux for each sensor separately. Further, the time for the change of flux between the sensors can also be detected.

With the present implementation of the sensor 1 there is, for example, a plurality of options for measuring the angular rate of rotation of the shaft. According to a first version, one of the three sensors 6_1 to 6_3 can count the edge changes between the grooves and webs. If the number of grooves and webs is known, the angular rate of rotation can be calculated. According to a further version, the time measurement between the three sensors is analyzed. As a result, the angular rate of rotation can be determined with a knowledge of the geometric arrangement of the sensors.

The direction of rotation of the component 7 is determined by analyzing the change of flux between the two sensors that are farthest apart when viewed in the circumferential direction. The two furthest apart sensors are the sensors 6_1 and 6_2 in the installation position shown in FIG. 3.

For this purpose, the direction of rotation is now taught in a learning phase, wherein the shaft 7 is rotated in a predetermined direction of rotation in order to teach the sensor device 1 which is the forward direction and which is the backward direction. For example, the sensor 6_1 detects the change of flux from a low flux to a higher flux before the sensor 6_3 during a rotation in the direction D2, which is by definition then the taught direction of rotation D2 and is stored in the analysis electronics. If the sensor 6_1 then detects the change of flux from low flux to higher flux before the sensor 6_3 during the measurement mode, the direction of rotation D2 is identified. Otherwise it is the opposite direction of rotation D1.

Although the invention has been described with reference to certain exemplary embodiments, it is clear to the person skilled in the art that various changes can be implemented and can be used as equivalent replacements without departing from the scope of the invention. In addition, many modifications can be implemented without departing from the associated scope. Consequently, the invention shall not be limited to the disclosed exemplary embodiments, but shall include all exemplary embodiments that fall within the scope of the accompanying claims. In particular, the invention also claims protection for the subject matter and the features of the dependent claims regardless of the claims that are referenced.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A sensor device (1) for contactlessly determining a revolution rate and a direction of rotation of a component (7) that rotates during operation of the component (7), the component (7) having, on at least one peripheral region, a circumferential structure of web-shaped or tooth-shaped radial protrusions (S) and interposed grooves (N) or tooth gaps, the sensor device (1) comprising:
    a threaded segment (3) configured to positionally fix an arrangement of the sensor device (1) so that the circumferential structure of the component (7) is movable past the sensor device (1);
    a magnetic field generating device; and
    a magnetic field detecting device having at least three magnetic field sensors (6_1, 6_2, 6_3) that are not arranged in alignment along a line,
    wherein a distance between the magnetic field sensors that are the farthest apart from each other is less than or equal to a width (d_N) of the grooves (N) or tooth gaps of the component (7).

2. The sensor device (1) of claim 1, wherein the three magnetic field sensors (6_1, 6_2, 6_3) are arranged in the form of an equilateral triangle.

3. The sensor device (1) of claim 2, further comprising an analyzer configured to analyze output signals of the at least three magnetic field sensors (6_1, 6_2, 6_3), the analyzer comprising a processor configured to determine which two of the at least three magnetic field sensors (6_1, 6_2) are the farthest apart from each other when viewed in the direction of rotation of the component and to use measured flux changes of said two farthest apart magnetic field sensors (6_1, 6_2) to determine a direction of rotation.

4. The sensor device (1) of claim 3, wherein the processor of the analyzer is configured to execute a learning function, by which the sensor device (1) stores which of the two farthest apart magnetic field sensors (6_1, 6_2) used for the determination of the direction of rotation must first detect a change of flux from a lower flux to a higher flux so that there is a first direction of rotation (D1) and not an opposite direction of rotation (D2).

5. The sensor device (1) of claim 1, wherein the at least three magnetic field sensors (6_1, 6_2, 6_3) are arranged in a plane perpendicular to a radial direction of the component (7) or the circumferential structure of the component (7).

6. The sensor device (1) of claim 1, wherein the sensor device (1) is configured to detect a vibration of the component (7) if the magnetic field sensor signals indicate an angular rate of rotation but no definite direction of rotation.

7. The sensor device (1) of claim 1, wherein the magnetic field sensors (6_1, 6_2, 6_3) are active magnetic field flux sensors that operate according to the Hall principle.

8. The sensor device (1) of claim 1, further comprising a housing, the housing comprising:
    an end region (4) in which the magnetic field sensors (6_1, 6_2, 6_3) are mounted to form a measurement tip;
    a housing body (2) having, arranged in the housing body (2):
        a plug connector (8), and
        a microprocessor to which output signals of the magnetic field sensors are transmitted for analysis; and
    a threaded segment (3) for screwing in the sensor device, the threaded segment (3) being arranged between the end region (4) and the housing body (2).

9. The sensor device (1) of claim 8, wherein the magnetic field generating device comprises a coil (5) configured to generate the magnetic field, the coil (5) being integrated within the threaded segment (3) of the housing.

10. A motor vehicle having the sensor device (1) of claim 1.

11. The motor vehicle of claim 10, wherein the motor vehicle is a commercial vehicle.

12. The sensor device (1) of claim 1, wherein the component (7) comprises a magnetizable shaft.

* * * * *